United States Patent
Ansari et al.

(10) Patent No.: US 11,472,715 B2
(45) Date of Patent: Oct. 18, 2022

(54) METHOD OF MAKING CARBON-ZINC OXIDE NANOPARTICLES

(71) Applicant: KING FAISAL UNIVERSITY, Al-Hassa (SA)

(72) Inventors: Sajid Ali Ansari, Al-Hassa (SA); Nazish Parveen, Al-Hassa (SA); Abdullah Aljaafari, Al-Hassa (SA); Adil Ahmed Al Shoaibi, Al-Hassa (SA)

(73) Assignee: KING FAISAL UNIVERSITY, Al-Hassa (SA)

( * ) Notice: Subject to any disclaimer, the term of this patent is extended or adjusted under 35 U.S.C. 154(b) by 0 days.

(21) Appl. No.: 17/169,438

(22) Filed: Feb. 6, 2021

(65) Prior Publication Data
US 2022/0127154 A1 Apr. 28, 2022

Related U.S. Application Data

(63) Continuation of application No. 17/079,373, filed on Oct. 23, 2020, now abandoned.

(51) Int. Cl.
*C01G 9/02* (2006.01)
*C02F 1/68* (2006.01)
(Continued)

(52) U.S. Cl.
CPC ............... *C01G 9/02* (2013.01); *C01B 32/15* (2017.08); *C02F 1/68* (2013.01); *B82Y 30/00* (2013.01);
(Continued)

(58) Field of Classification Search
None
See application file for complete search history.

(56) References Cited

U.S. PATENT DOCUMENTS

| | | | |
|---|---|---|---|
| 2010/0034730 A1 | 2/2010 | Lu et al. | |
| 2010/0059706 A1* | 3/2010 | Dai | H01M 4/1397 252/182.1 |
| 2013/0309591 A1* | 11/2013 | Huang | C04B 35/14 429/452 |

FOREIGN PATENT DOCUMENTS

| | | | | |
|---|---|---|---|---|
| CN | 102838159 A | | 12/2012 | |
| CN | 107552034 A | * | 1/2018 | B01J 23/06 |

(Continued)

OTHER PUBLICATIONS

Wisetringthuon et al (Thermal decomposition synthesis and magnetic properties of crystalline zinc oxide powders, IOP Conf. Series: J of Phys: Conf. Series. 1144 (2018) pp. 1-4) (Year: 2018).*
Shankar et al ("UV-vis Photoresponse ofZnO Nanoparticles Prepared by Thermal Decomposition of Zinc Nitrate," 2013 Intl. Conf. Energy Efficient Tech. for Sustainability, (2013), pp. 888-890) (Year: 2013).*

(Continued)

*Primary Examiner* — Colin W. Slifka
*Assistant Examiner* — Michael Forrest
(74) *Attorney, Agent, or Firm* — Nath, Goldberg & Meyer; Richard C. Litman

(57) ABSTRACT

The method of making carbon-zinc oxide (C—ZnO) nanoparticles includes grinding a mixture of zinc nitrate hexahydrate ($Zn(NO_3)_2 \cdot 6H_2O$) and furfural ($C_4H_3OCHO$) to produce a ground mixture. As a non-limiting example, the zinc nitrate hexahydrate ($Zn(NO_3)_2 \cdot 6H_2O$) and the furfural ($C_4H_3OCHO$) may be placed in a mortar and ground, by hand with a pestle, for approximately 10 minutes. The ground mixture is then heated to produce the C—ZnO nanoparticles. As a non-limiting example, the ground mixture may be heated in a quartz tube at a temperature of approximately 500° C.

4 Claims, 1 Drawing Sheet

(51) Int. Cl.
    *C01B 32/15*     (2017.01)
    *B82Y 30/00*     (2011.01)
    *B82Y 40/00*     (2011.01)
    *C02F 101/30*     (2006.01)

(52) U.S. Cl.
    CPC ........... *B82Y 40/00* (2013.01); *C01P 2004/64* (2013.01); *C02F 2101/308* (2013.01)

(56) References Cited

FOREIGN PATENT DOCUMENTS

| | | | | |
|---|---|---|---|---|
| CN | 108452767 A | | 8/2018 | |
| CN | 108816263 A | * | 11/2018 | .............. B01J 27/24 |
| CN | 108940252 A | | 12/2018 | |

OTHER PUBLICATIONS

Saxena et al ("Study of Photoconductivity and Photoluminescence in ZnO Microstructures Synthesized by Thermal Decomposition of Zinc Nitrate", Proc. Natl. Acad. Sci. India, Sect. A. Phys. Sci. (2018) 88(1): 157-162) (Year: 2018).*

Zhang et al (Mass Production, Enhanced Visible Light Phtocatalytic Efficiency, and Application of Modified ZnO Nanocrystals by Carbon Dots, Ind. Eng. Chem. Res. (2015), 54, 6, 1766-1772) (Year: 2015).*

Ansari, Sajid Ali, et al. "Facile and sustainable synthesis of carbon-doped ZnO nanostructures towards the superior visible light photocatalytic performance." New Journal of Chemistry 41.17 (2017): 9314-9320.

\* cited by examiner

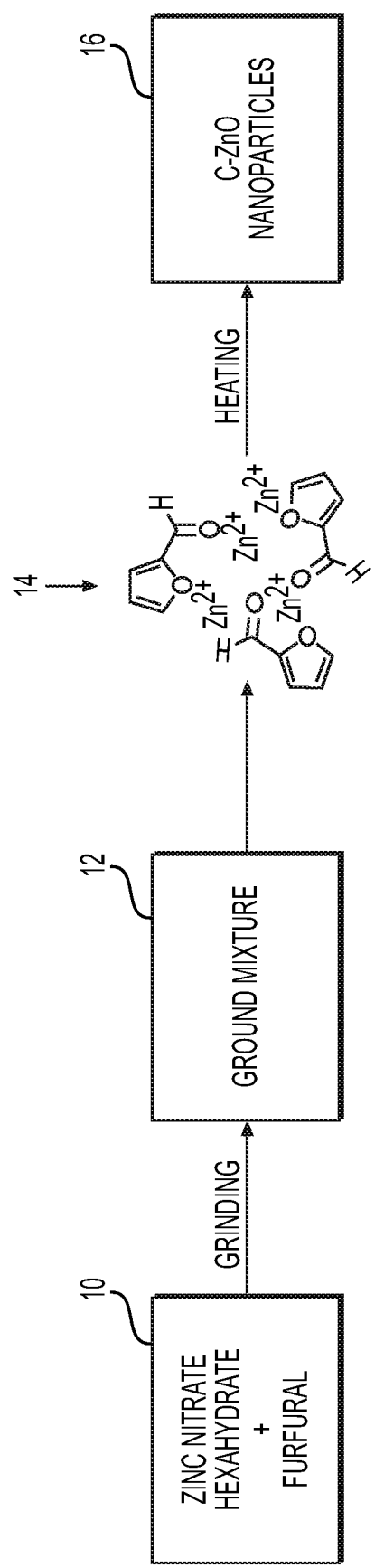

METHOD OF MAKING CARBON-ZINC OXIDE NANOPARTICLES

CROSS-REFERENCE TO RELATED APPLICATIONS

This is a continuation of prior U.S. application Ser. No. 17/079,373, filed Oct. 23, 2020, now pending.

BACKGROUND

1. Field

The disclosure of the present patent application relates to a method of making carbon-zinc oxide (C—ZnO) nanoparticles, and particularly to a method for producing carbon-zinc oxide (C—ZnO) nanoparticles using zinc nitrate hexahydrate $(Zn(NO_3)_2.6H_2O)$ and furfural $(C_4H_3OCHO)$ as base materials.

2. Description of the Related Art

Nanoparticles may be produced using a variety of different methods, with varying degrees of success. Such methods include pyrolysis, condensation from plasma, inert gas condensation, radiolysis, wet chemistry, and ion implantation. Some of these methods typically require highly specialized equipment and are costly, both in terms of energy expenditure and the financial costs of the materials and equipment involved.

Carbon-zinc oxide nanomaterials are versatile and may be used for a variety of different purposes, such as electromagnetic absorption, and as the basis of electrochemical sensors. Given the usefulness of carbon-zinc oxide nanoparticles, it would be desirable to have an easy and cost-effective method of producing large quantities of carbon-zinc oxide nanoparticles. Thus, a method of making carbon-zinc oxide nanoparticles solving the aforementioned problems is desired.

SUMMARY

A method of making carbon-zinc oxide (C—ZnO) nanoparticles is a cost-effective and template-free method for producing C—ZnO nanoparticles. A mixture of zinc nitrate hexahydrate $(Zn(NO_3)_2.6H_2O)$ and furfural $(C_4H_3OCHO)$ are ground together to produce a ground mixture. As a non-limiting example, the zinc nitrate hexahydrate $(Zn(NO_3)_2.6H_2O)$ and the furfural $(C_4H_3OCHO)$ may be ground by hand in a mortar with a pestle, for approximately 10 minutes to provide the ground mixture. The ground mixture can then be heated to produce the C—ZnO nanoparticles. As a non-limiting example, the ground mixture may be heated in a quartz tube at a temperature of approximately 500° C. The method does not require the use of surfactants.

These and other features of the present subject matter will become readily apparent upon further review of the following specification.

BRIEF DESCRIPTION OF THE DRAWINGS

The sole drawing FIGURE shows steps of a method of making carbon-zinc oxide (C—ZnO) nanoparticles.

Similar reference characters denote corresponding features consistently throughout the attached drawings.

DETAILED DESCRIPTION OF THE PREFERRED EMBODIMENTS

The method of making carbon-zinc oxide (C—ZnO) nanoparticles can include grinding a mixture of zinc nitrate hexahydrate $(Zn(NO_3)_2.6H_2O)$ and furfural $(C_4H_3OCHO)$ (indicated as 10 in the sole drawing FIGURE) to produce a ground mixture 12. As a non-limiting example, the zinc nitrate hexahydrate $(Zn(NO_3)_2.6H_2O)$ and the furfural $(C_4H_3OCHO)$ may be ground in a mortar by hand using a pestle, for approximately 10 minutes. Within the ground mixture, there can be a complex formation between the respective inorganic and organic moieties (indicated as 14 in the sole drawing FIGURE). The ground mixture is then heated to produce the C—ZnO nanoparticles 16. Furfural provides a carbon source and prevents the agglomeration of ZnO nanoparticles. As a non-limiting example, the ground mixture may be heated in a quartz tube at a temperature of approximately 500° C. within a furnace or the like. The C—ZnO nanoparticles can be crystalline and mesoporous.

The C—ZnO nanoparticles can provide outstanding degradation of organic pollutants, e.g., organic dyes, in an aqueous solution under visible light irradiation. For example, the C—ZnO nanoparticles showed greater photocatalytic performance in degradation of a model RhB dye under visible light irradiation than P—Zno.

In experiments, 1 g of zinc nitrate hexahydrate $(Zn(NO_3)_2.6H_2O)$ was mixed with 1 mL of furfural $(C_4H_3OCHO)$ and ground for 10 minutes by hand grinding with a mortar and pestle. The ground mixture was then transferred into a quartz tube and heated at 500° C., producing C-ZnO nanoparticles with an average particle size between approximately 2 nm and 5 nm. For purposes of comparison, pure furfural (without zinc nitrate hexahydrate) was prepared in a similar manner, resulting in no nanoparticles. Similarly, pure zinc nitrate hexahydrate (without furfural) was prepared in a similar manner, resulting in particles having an average particle size of 5 μm. as opposed to nanoparticles.

It is to be understood that the method of making carbon-zinc oxide nanoparticles is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making carbon-zinc oxide nanoparticles, comprising the steps of:
   grinding a mixture of zinc nitrate hexahydrate $(Zn(NO_3)_2.6H_2O)$ and furfural $(C_4H_3OCHO)$ to produce a ground mixture; and
   heating the ground mixture to produce carbon-zinc oxide nanoparticles, the carbon-zinc oxide nanoparticles range from about 2 nm to about 5 nm.

2. The method of making carbon-zinc oxide nanoparticles as recited in claim 1, wherein the step of grinding the mixture of the zinc nitrate hexahydrate $(Zn(NO_3)_2.6H_2O)$ and furfural $(C_4H_3OCHO)$ comprises grinding for 10 minutes.

3. The method of making carbon-zinc oxide nanoparticles as recited in claim 1, wherein the step of heating the ground mixture comprises heating the ground mixture in a quartz tube.

4. The method of making carbon-zinc oxide nanoparticles as recited in claim 1, wherein the step of heating the ground mixture comprises heating the ground mixture at a temperature of 500° C.

\* \* \* \* \*